(12) United States Patent
Zhang et al.

(10) Patent No.: US 12,362,811 B2
(45) Date of Patent: Jul. 15, 2025

(54) TRANSMITTER BEAM SELECTION FOR PUCCH AND PUSCH

(71) Applicant: Apple Inc., Cupertino, CA (US)

(72) Inventors: Yushu Zhang, Beijing (CN); Dawei Zhang, Saratoga, CA (US); Haitong Sun, Cupertino, CA (US); Hong He, San Jose, CA (US); Jie Cui, San Jose, CA (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 365 days.

(21) Appl. No.: 17/995,449

(22) PCT Filed: Apr. 8, 2020

(86) PCT No.: PCT/CN2020/083700
§ 371 (c)(1),
(2) Date: Oct. 4, 2022

(87) PCT Pub. No.: WO2021/203279
PCT Pub. Date: Oct. 14, 2021

(65) Prior Publication Data
US 2023/0199756 A1 Jun. 22, 2023

(51) Int. Cl.
*H04W 72/1268* (2023.01)
*H04B 7/08* (2006.01)
(Continued)

(52) U.S. Cl.
CPC ........ *H04W 72/1268* (2013.01); *H04B 7/088* (2013.01); *H04W 72/23* (2023.01); *H04W 72/51* (2023.01)

(58) Field of Classification Search
CPC . H04W 72/1268; H04W 72/51; H04W 72/23; H04B 7/088
See application file for complete search history.

(56) References Cited

U.S. PATENT DOCUMENTS

2016/0183234 A1* 6/2016 Sung .................. H04W 72/046
370/329
2017/0346535 A1* 11/2017 Islam .................... H04W 16/28
(Continued)

FOREIGN PATENT DOCUMENTS

| CN | 110475360 | 11/2019 |
|---|---|---|
| WO | 2017/034607 | 3/2017 |
| WO | 2019/032882 | 2/2019 |

OTHER PUBLICATIONS

Intel Corporation, "On beam indication on control and data channel", 3GPP TSG RAN WG1 #88, R1-1702200, Feb. 7, 2017, 4 sheets.
(Continued)

*Primary Examiner* — Jael M Ulysse
(74) *Attorney, Agent, or Firm* — Fay Kaplun & Marcin, LLP

(57) ABSTRACT

The exemplary embodiments relate to determining which instance of control information is to be used for transmitter beam selection. A user equipment may receive a medium access control (MAC) control element (CE) that includes first control information associated with transmitter beam selection, transmit an acknowledgement (ACK) to the network in response to receiving the MAC CE and receive a downlink signal over a physical downlink control channel (PDCCH) that schedules an uplink transmission. The downlink signal is received prior to an expiration of a predetermined duration relative to transmitting the ACK and includes second control information associated with transmitter beam selection. The UE may also transmit an uplink signal based on the scheduled uplink transmission. The UE selects a transmitter beam for the uplink signal based on one of the first control information or the second control information.

20 Claims, 8 Drawing Sheets

(51) Int. Cl.
*H04W 72/23* (2023.01)
*H04W 72/51* (2023.01)

(56) References Cited

U.S. PATENT DOCUMENTS

| | | | |
|---|---|---|---|
| 2017/0346544 A1* | 11/2017 | Islam | H04B 7/0628 |
| 2017/0346545 A1* | 11/2017 | Islam | H04B 7/0695 |
| 2019/0074882 A1 | 3/2019 | Zhou et al. | |
| 2019/0082438 A1* | 3/2019 | John Wilson | H04W 72/0446 |
| 2019/0181941 A1* | 6/2019 | Kim | H04B 7/0695 |
| 2019/0199496 A1 | 6/2019 | Qin et al. | |
| 2019/0260456 A1* | 8/2019 | Zhou | H04W 24/08 |
| 2019/0306867 A1* | 10/2019 | Cirik | H04W 36/0005 |
| 2019/0313389 A1* | 10/2019 | John Wilson | H04W 72/21 |
| 2019/0373450 A1* | 12/2019 | Zhou | H04L 5/0092 |
| 2020/0053717 A1 | 2/2020 | Zhou et al. | |
| 2020/0260432 A1* | 8/2020 | Islam | H04L 5/0051 |
| 2021/0051651 A1* | 2/2021 | He | H04W 72/044 |
| 2021/0194756 A1* | 6/2021 | Babaei | H04B 7/088 |
| 2023/0028423 A1* | 1/2023 | Xu | H04B 7/0639 |

OTHER PUBLICATIONS

Oppo, "Discussion on Multi-beam Operation Enhancements", 3GPP TSG RAN WG1 #99, R1-1911844, Nov. 8, 2019, 13 sheets.
LG Electronics, "Discussion on UL beam management"; 3GPP TSG RAN WG1, Meeting #90, R1-1713150, Aug. 25, 2017.
Samsung, "Discussion on Beam Indication for UL Transmission"; 3GPP TSG RAN WG1, Meeting #90, R1-1714517, Aug. 25, 2017.

* cited by examiner

TRANSMITTER BEAM SELECTION FOR PUCCH AND PUSCH

BACKGROUND

A user equipment (UE) may establish a connection to at least one of multiple different networks or types of networks. In some networks, signaling between the UE and a cell of the network may be achieved by beamforming which is an antenna technique used to transmit or receive a directional signal. On the transmitting side, beamforming may include propagating a directional signal. A beamformed signal may be referred to as a transmitter beam.

During operation, the UE may select a transmitter beam that is to be used by the UE for an uplink transmission based, at least in part, on control information received from the cell. Under conventional circumstances, the UE may receive multiple instances of control information. Each instance of control information may be applicable to the same uplink transmission but correspond to a different transmitter beam. Accordingly, there is a need for a mechanism that is configured to determine which instance of control information is to be used by the UE to select the transmitter beam.

SUMMARY

According to an exemplary embodiment is a method is performed at a user equipment (UE). The method includes receiving a medium access control (MAC) control element (CE) that includes first control information associated with transmitter beam selection, transmitting an acknowledgement (ACK) to the network in response to receiving the MAC CE and receiving a downlink signal over a physical downlink control channel (PDCCH) that schedules an uplink transmission. The downlink signal is received prior to an expiration of a predetermined duration relative to transmitting the ACK and includes second control information associated with transmitter beam selection. The method also includes transmitting an uplink signal based on the scheduled uplink transmission. The UE selects a transmitter beam for the uplink signal based on one of the first control information or the second control information.

Further exemplary embodiments include a transceiver configured to communicate with a network and a processor configured to perform operations. The operations include receiving a medium access control (MAC) control element (CE) that includes first control information associated with transmitter beam selection, transmitting an acknowledgement (ACK) to the network in response to receiving the MAC CE and receiving a downlink signal over a physical downlink control channel (PDCCH) that schedules an uplink transmission. The downlink signal is received prior to an expiration of a predetermined duration relative to transmitting the ACK and includes second control information associated with transmitter beam selection. The operations also include transmitting an uplink signal based on the scheduled uplink transmission. The UE selects a transmitter beam for the uplink signal based on one of the first control information or the second control information.

Still further exemplary embodiments include an integrated circuit. The integrated circuit include circuitry configured to receive a medium access control (MAC) control element (CE) that includes first control information associated with a user equipment (UE) performing transmitter beam selection, transmit an acknowledgement (ACK) to the network in response to receiving the MAC CE and receive a downlink signal over a physical downlink control channel (PDCCH) that schedules an uplink transmission. The downlink signal is received prior to an expiration of a predetermined duration relative to transmitting the ACK and includes second control information associated with transmitter beam selection. The integrated circuit also includes circuitry configured to transmit an uplink signal based on the scheduled uplink transmission. The UE selects a transmitter beam for the uplink signal based on one of the first control information or the second control information.

DETAILED DESCRIPTION

Figure 1:
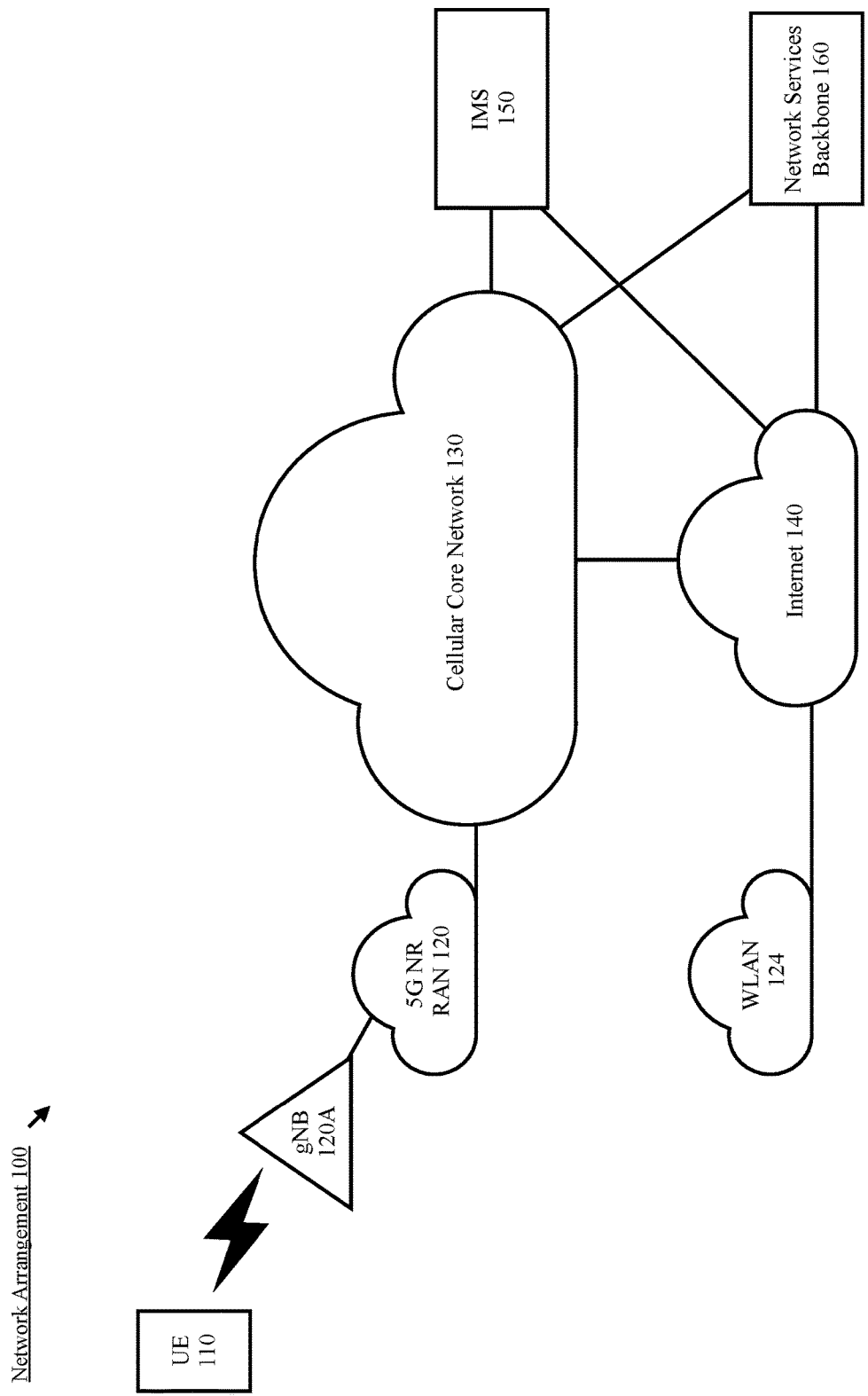
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to a user equipment (UE) determining which instance of control information is to be used for transmitter beam selection.

The exemplary embodiments are described with regard to beamforming which is an antenna technique that is utilized to transmit and receive a directional signal. From the perspective of a transmitting device, beamforming may refer to propagating a directional signal. Throughout this description, a beamformed signal may be referred to as a transmitter beam. Those skilled in the art will understand that transmitter beams may vary in width and be propagated in any of a plurality of different directions.

The exemplary embodiments are also described with regard to the UE using a transmitter beam to communicate with a cell of the network. However, reference to a UE is merely provided for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component that is capable of beamforming.

The network may be a 5G New Radio (NR) network and the cell may be a next generation Node B (gNB). The 5G NR network may utilize the millimeter wave (mmWave) spectrum. The mmWave spectrum is comprised of frequency bands that each have a wavelength of 1-10 millimeters. The mmWave frequency bands may be located between, approximately, 10 gigahertz (GHz) and 300 GHz. However, reference to the 5G NR network and the gNB is merely provided for illustrative purposes. The exemplary embodiments may apply to any type of network and any type of cell within the corresponding network that is capable of beamforming.

Various examples described herein relate to a scenario in which the cell transmits multiple instances of control information to the UE. Under conventional circumstances, each instance of the control information may be applicable to the same uplink transmission but correspond to a different transmitter beam. For example, at a first time, the UE may receive a downlink signal that includes control information that may be applicable to a subsequent uplink transmission.

At a second time, prior to the uplink transmission, the UE may receive a further downlink signal that includes control information that may also be applicable to the same uplink transmission. Specific examples of the type of downlink signals, the type of control information and the type of uplink transmissions will be described in more detail below. The exemplary embodiments relate to how the UE may determine which instance of control information is to be utilized to select the transmitter beam that is to be utilized for the uplink transmission.

FIG. 1 shows a network arrangement 100 according to various exemplary embodiments. The network arrangement 100 includes the UE 110. Those skilled in the art will understand that the UE 110 may be any type of electronic component that is capable of beamforming and configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. An actual network arrangement may include any number of UEs being used by any number of users. Thus, the example of a single UE 110 is only provided for illustrative purposes.

The UE 110 may be configured to communicate directly with one or more networks. In the example of the network arrangement 100, the UE 110 may wirelessly communicate with a 5G new radio (NR) radio access network (5G NR RAN) 120 and a wireless local access network (WLAN) 122. However, the UE 110 may also communicate with other types of networks (e.g., an LTE RAN, a legacy RAN etc.). The UE 110 may also communicate with networks over a wired connection. Therefore, the UE 110 may include a 5G NR chipset to communicate with the 5G NR RAN 120 and an ISM chipset to communicate with the WLAN 122.

The 5G NR RAN 120 may be a portion of a cellular network that may be deployed by a network carrier (e.g., Verizon, AT&T, Sprint, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 122 may include any type of wireless local area network (WiFi, Hot Spot, IEEE 802.11x networks, etc.).

The UE 110 may connect to the 5G NR RAN 120 via a next generation Node B (gNB) 120A. Those skilled in the art will understand that any association procedure may be performed for the UE 110 to connect to the 5G NR RAN 120. For example, as discussed above, the 5G NR RAN 120 may be associated with a particular network carrier where the UE 110 and/or the user thereof has a contract and credential information (e.g., stored on a SIM card). Upon detecting the presence of the 5G NR RAN 120, the UE 110 may transmit the corresponding credential information to associate with the 5G NR RAN 120. More specifically, the UE 110 may associate with a specific cell (e.g., the gNB 120A of the 5G NR RAN 120). As mentioned above, the use of the 5G NR RAN 120 is for illustrative purposes and any type of network may be used. For example, the UE 110 may also connect to the LTE-RAN (not pictured) or the legacy RAN (not pictured).

In addition to the networks 120 and 122 the network arrangement 100 also includes a cellular core network 130. The cellular core network 130 may be considered to be the interconnected set of components that manages the operation and traffic of the cellular network. The network arrangement 100 also includes the Internet 140, an IP Multimedia Subsystem (IMS) 150, and a network services backbone 160. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
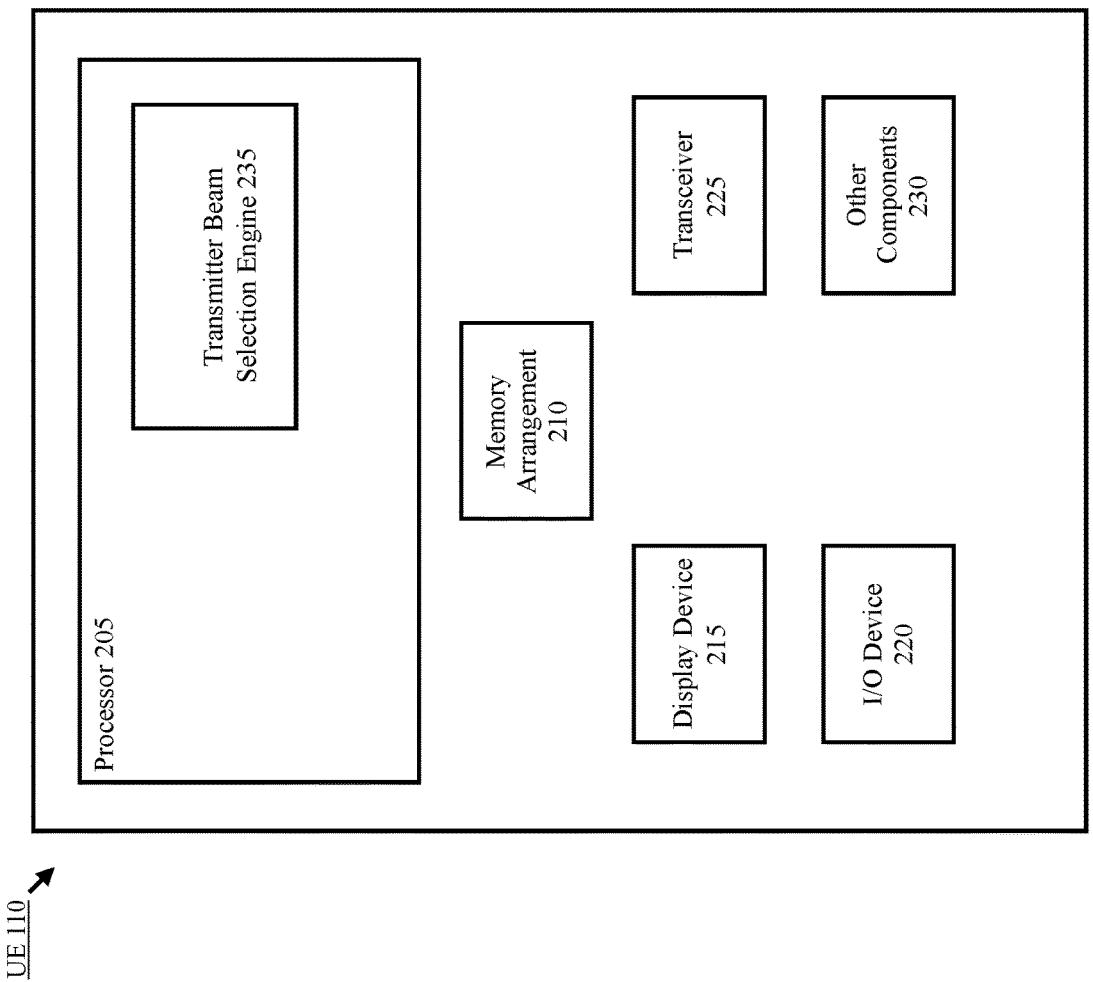
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include a transmitter beam selection engine 235. The transmitter beam selection engine 235 may perform various operations related to selecting a transmitter beam that is to be used by the UE 110 for an uplink transmission.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engine may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120 and the WLAN 122. Accordingly, the transceiver 225 may operate on a variety of different frequencies or channels (e.g., set of consecutive frequencies).

Figure 3:
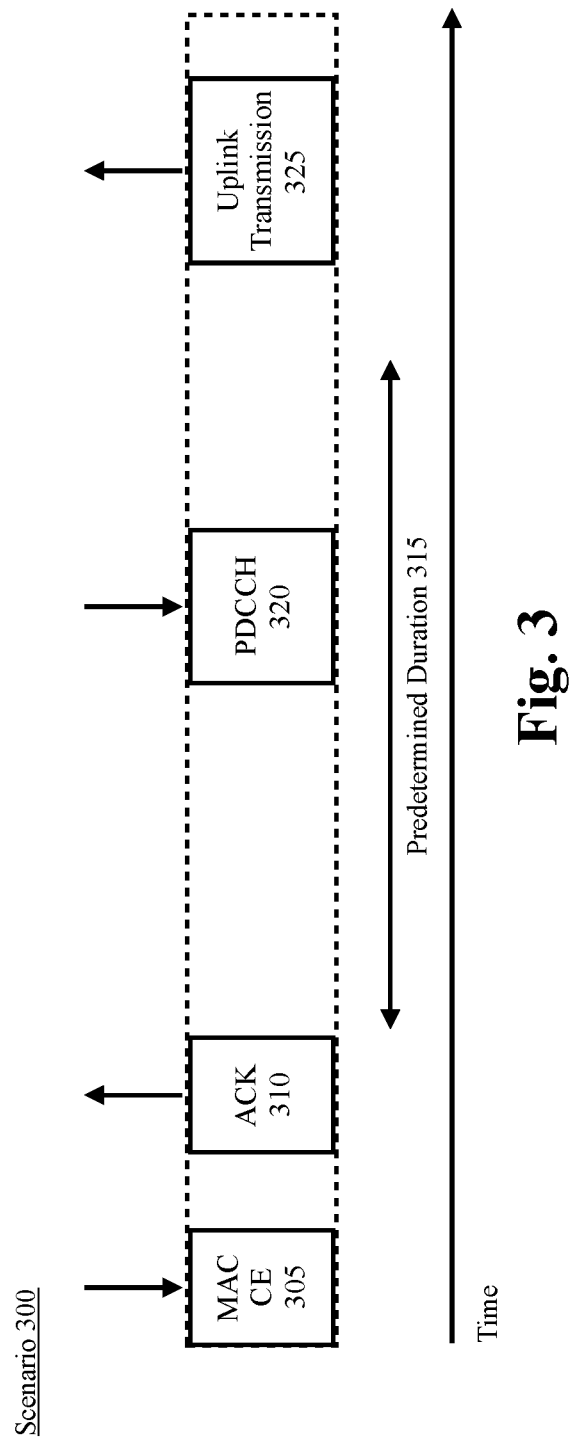
FIG. 3 shows an exemplary scenario in which the UE receives multiple instances of control information that may be applicable to the same uplink transmission.

FIG. 3 shows an exemplary scenario 300 in which the UE 110 receives multiple instances of control information that may be applicable to the same uplink transmission. The exemplary scenario 300 provides a general overview of the type of issue the exemplary embodiments are aiming to solve.

The exemplary scenario 300 illustrates a timeline from the perspective of the UE 110. In 305, the UE 110 receives a medium access control (MAC) control element (CE). Generally, the MAC CE may include control information that indicates to the UE 110 a transmitter beam that is to be used for a subsequent uplink transmission. In 310, the UE 110 transmits an acknowledgement (ACK) to the network indicating that the UE 110 has successfully received the MAC CE in 305. In accordance with various standards and/or to ensure that the cell is configured to receive the transmitter beam indicated in 305, the UE 110 may be configured to apply the control information to transmissions that are performed after a predetermined duration 315 (e.g., 3 milliseconds (MS)) has elapsed.

In 320, the UE 110 receives a signal over a physical downlink control channel (PDCCH) prior to the expiration of the predetermined duration 315. This signal may schedule a subsequent uplink transmission over a physical uplink control channel (PUCCH) or a physical uplink shared channel (PUSCH). Further, this signal may also include an indication of a transmitter beam that may be used for the scheduled uplink transmission.

The uplink transmission is scheduled to occur at 325 which is after the predetermined duration 315 has expired. Thus, from the perspective of the UE 110, the transmitter beam indicated in 305 via the MAC CE and the transmitter beam indicated in 320 via the PDCCH may both be applicable to the scheduled uplink transmission 325. The exemplary embodiments relate to the UE 110 determining which transmitter beam is to be used for the uplink transmission in 325.

Figure 4:
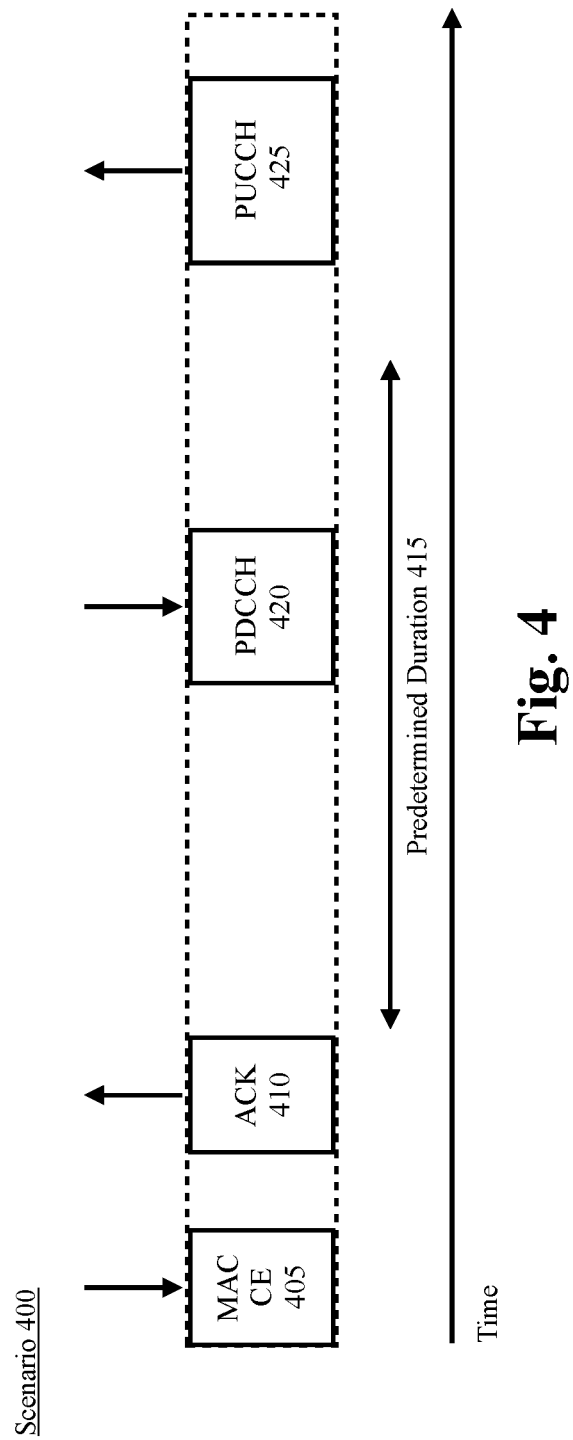
FIG. 4 shows an exemplary scenario in which the UE selects a transmitter beam for an aperiodic PUCCH transmission according to various exemplary embodiments.

FIG. 4 shows an exemplary scenario 400 in which the UE 110 selects a transmitter beam for an aperiodic PUCCH transmission according to various exemplary embodiments. The exemplary scenario 400 relates to the UE 110 performing an aperiodic PUCCH transmission. The exemplary scenario 400 illustrates a timeline from the perspective of the UE 110.

In 405, the UE 110 receives a MAC CE. In this example, the MAC CE may include a beam indication for a particular PUCCH resource (x) or a PUCCH resource group that include the PUCCH resource (x). The beam indication may include spatial relation information that indicates a correlation between the downlink signal received in 405 and a particular transmitter beam. Thus, the UE 110 may select a transmitter beam based on the spatial relation information included in the beam indication.

In 410, the UE 110 transmits an ACK to indicate to the cell that the UE 110 has successfully received the MAC CE in 405. In accordance with various standards and/or to ensure that the cell is configured to receive a transmitter beam selected by the UE 110 based on the spatial relation information received in 405, the UE 110 may be configured to apply the spatial relation information to PUCCH transmissions that are performed after a predetermined duration 415 has expired.

In 420, the UE 110 receives a signal over the PDCCH. This signal may trigger an uplink transmission on PUCCH resource (x) and include spatial relation information. The uplink transmission on PUCCH resource (x) is scheduled to occur at 425. At this time, the UE 110 has two options for transmitter beam selection. The first option is for the UE 110 to select a transmitter beam for the scheduled aperiodic PUCCH transmission in 425 based on the spatial relation information indicated in the signal received over the PDCCH in 420. The second option is for the UE 110 to select a transmitter beam for the scheduled aperiodic PUCCH transmission in 425 based on the spatial relation information indicated in the MAC CE received in 405.

In some exemplary embodiments, the UE 110 may be preconfigured to use the first option or the second option in this type of scenario. The UE 110 may indicate to the cell whether the UE 110 is preconfigured to use the spatial relation information indicated in the MAC CE or the spatial relation information indicated in the PDCCH in a UE capability information message. In other exemplary embodiments, the network may configure the UE 110 to the first option or the second option in this type of scenario. The network may configure the UE 110 with the first option or the second option, for example, using a MAC CE or a radio resource control (RRC) message.

Figure 5:
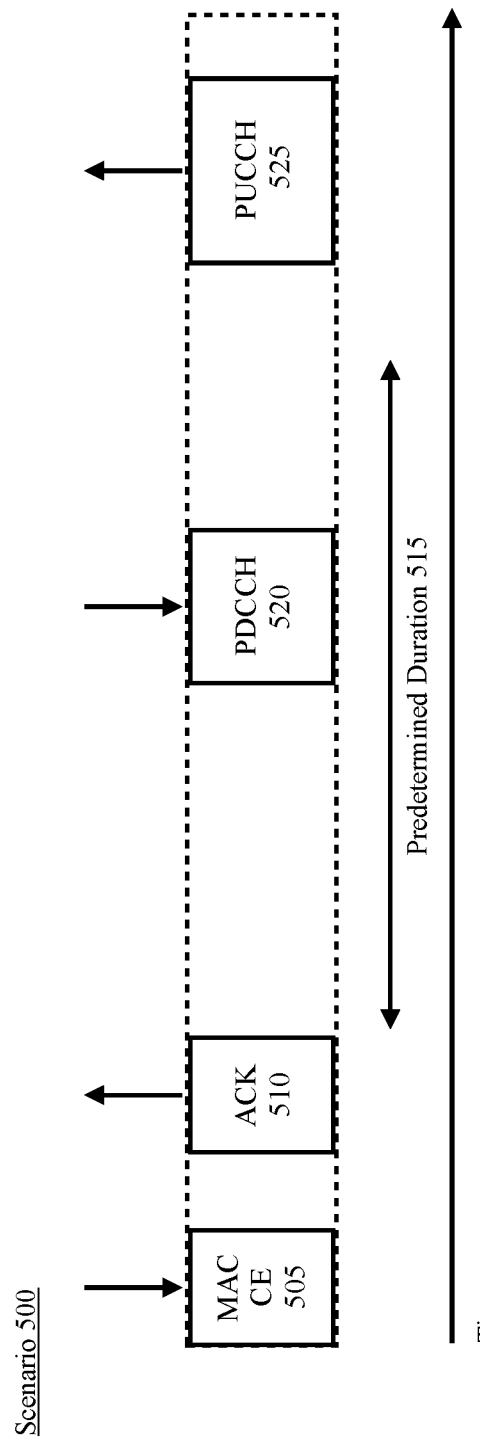
FIG. 5 shows an exemplary scenario in which the UE selects a transmitter beam for an aperiodic PUCCH transmission according to various exemplary embodiments.

FIG. 5 shows an exemplary scenario 500 in which the UE 110 selects a transmitter beam for an aperiodic PUCCH transmission according to various exemplary embodiments. As will be described in more detail below, unlike the exemplary scenario 400, the spatial relation information is not explicitly indicated to the UE 110 in the exemplary scenario 500.

The exemplary scenario 500 relates to the UE 110 performing an aperiodic PUCCH transmission. The exemplary scenario 500 illustrates a timeline from the perspective of the UE 110.

In 505, the UE 110 receives a MAC CE. In this example, the MAC CE may indicate a particular transmission configuration indicator (TCI) for a control resource set (CORESET). The UE 110 may apply the TCI indicated in this MAC CE for a particular PUCCH resource (x) or a PUCCH resource group that includes the PUCCH resource (x).

In 510, the UE 110 transmits an ACK to indicate to the cell that the UE 110 has successfully received the MAC CE in 505. In accordance with various standards and/or to ensure that the cell is configured to receive a transmitter beam selected by the UE 110 based on the TCI state indicated in the MAC CE received in 505, the UE 110 may be configured to apply this control information to PUCCH transmissions that are performed after a predetermined duration 515 has expired.

In 520, the UE 110 receives a signal over the PDCCH. This signal may trigger an uplink transmission on PUCCH resource (x) and may also indicate a TCI for a CORESET.

The uplink transmission on PUCCH resource (x) is scheduled to occur at 525. At this time, the UE 110 has two options for transmitter beam selection. The first option is for the UE 110 to select a transmitter beam for the scheduled aperiodic PUCCH transmission in 525 based on the TCI indicated in the signal received over the PDCCH in 520 for the CORESET with the lowest ID in the same bandwidth part (BWP) in the slot with the scheduling PDCCH. The second option is for the UE 110 to select a transmitter beam for the scheduled aperiodic PUCCH transmission in 525 based on the TCI indicated in the MAC CE received in 505 for the CORESET with the lowest ID in the same BWP in the slot with the scheduled PUCCH.

In some embodiments, the UE 110 may be preconfigured to use the first option or the second option in this type of scenario. The UE 110 may indicate to the cell whether the UE 110 is preconfigured to use the TCI indicated in the MAC CE or the TCI indicated in the PDCCH in a UE capability information message. In other embodiments, the network may configure the UE 110 to use the first option or the second option in this type of scenario. The network may configure the UE 110 with the first option or the second option using, for example, a MAC CE or an RRC message.

Figure 6:
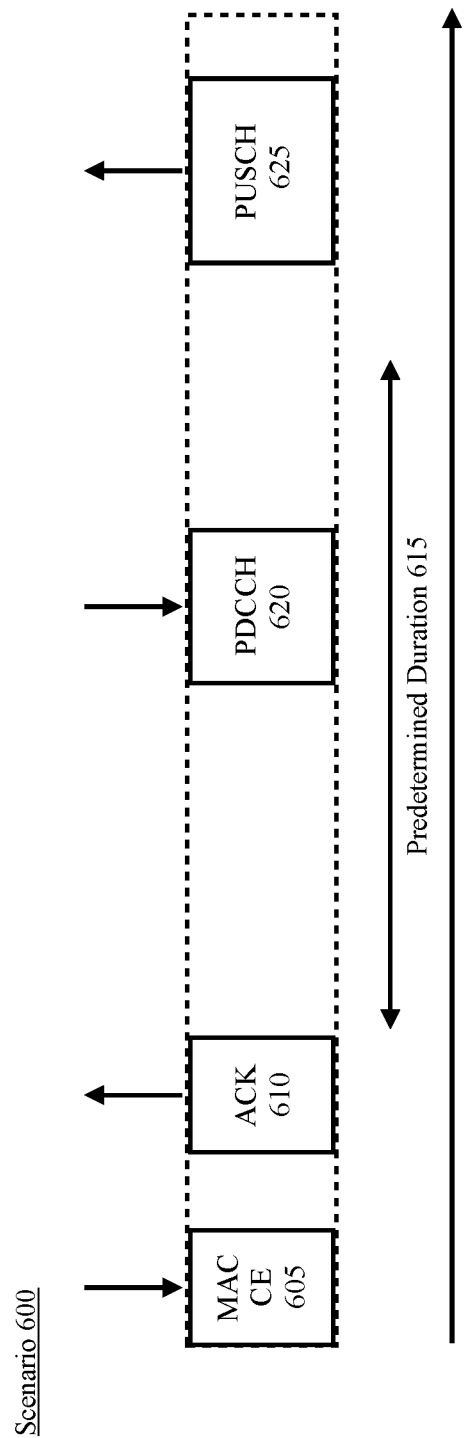
FIG. 6 shows an exemplary scenario in which the UE selects a transmitter beam for a PUSCH transmission scheduled by downlink control information (DCI) format 0_0 if at least one PUCCH resource is configured in the same bandwidth part (BWP) according to various exemplary embodiments.

FIG. 6 shows an exemplary scenario 600 in which the UE 110 selects a transmitter beam for a PUSCH transmission scheduled by downlink control information (DCI) format 0_0 if at least one PUCCH resource is configured in the same BWP as the PUSCH according to various exemplary embodiments.

The exemplary scenario 600 relates to the UE 110 performing a PUSCH transmission. The exemplary scenario 600 illustrates a timeline from the perspective of the UE 110.

In 605, the UE 110 receives a MAC CE. In this example, the MAC CE may include a beam indication for a particular PUCCH resource (x) or a PUCCH resource group that include the PUCCH resource (x). The beam indication may include spatial relation information that indicates a correlation between the downlink signal received in 605 and a particular transmitter beam. Thus, the UE 110 may select a transmitter beam for a PUSCH transmission based on the spatial relation information included in the beam indication for a PUCCH resource.

In 610, the UE 110 transmits an ACK to indicate to the cell that the UE 110 has successfully received the MAC CE in 605. In accordance with various standards and/or to ensure that the cell is configured to receive a transmitter beam selected by the UE 110 based on the spatial relation information received in 605, the UE 110 may be configured to apply the spatial relation information to PUSCH transmissions that are performed after a predetermined duration 615 has expired.

In 620, the UE 110 receives a signal over the PDCCH. This signal may trigger an uplink transmission over the PUSCH and include spatial relation information. The uplink transmission over the PUSCH is scheduled to occur at 625. At this time, the UE 110 has two options for transmitter beam selection. The first option is for the UE 110 to select a transmitter beam for the scheduled PUSCH transmission in 625 based on the spatial relation information for a PUCCH with the lowest resource ID in the slot with the scheduling PDCCH.

The second option is for the UE 110 to select a transmitter beam for the scheduled PUSCH transmission in 625 based on the spatial relation information indicated in the MAC CE received in 605.

In some embodiments, the UE 110 may be preconfigured to use the first option or the second option in this type of scenario. The UE 110 may indicate to the cell whether the UE 110 is preconfigured to use the spatial relation information indicated in the MAC CE or the spatial relation information indicated in the PDCCH in a UE capability information message. In other embodiments, the network may configure the UE 110 to use the first option or the second option in this type of scenario. The network may configure the UE 110 with the first option or the second option using a MAC CE or an RRC message.

Figure 7:
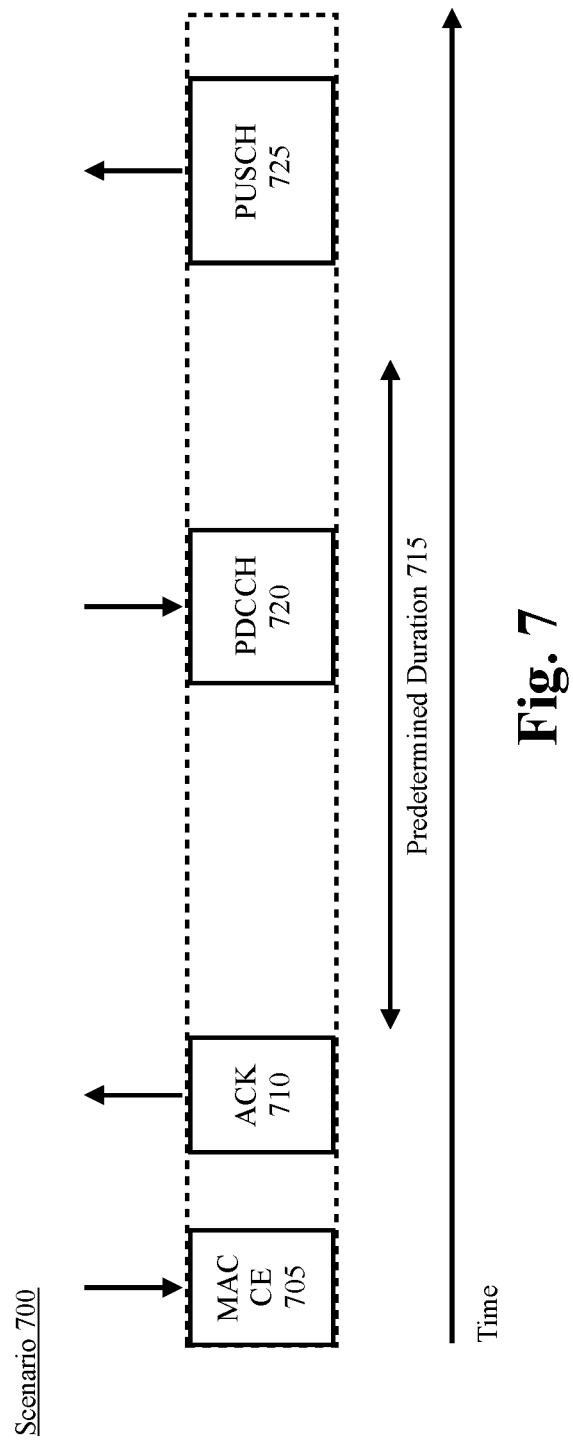
FIG. 7 shows an exemplary scenario in which the UE selects a transmitter beam for a PUSCH transmission scheduled by downlink control information (DCI) format 0_0 if no PUCCH resource is configured in the same BWP and at least one CORESET is configured according to various exemplary embodiments.

FIG. 7 shows an exemplary scenario 700 in which the UE 110 selects a transmitter beam for a PUSCH transmission scheduled by downlink control information (DCI) format 0_0 if no PUCCH resource is configured in the same BWP as the PUSCH and at least one CORESET is configured according to various exemplary embodiments.

The exemplary scenario 700 relates to the UE 110 performing a PUSCH transmission. The exemplary scenario 700 illustrates a timeline from the perspective of the UE 110.

In 705, the UE 110 receives a MAC CE. In this example, the MAC CE may indicate a particular TCI for the CORESET with the lowest ID in the current BWP.

In 710, the UE 110 transmits an ACK to indicate to the cell that the UE 110 has successfully received the MAC CE in 705. In accordance with various standards and/or to ensure that the cell is configured to receive a transmitter beam selected by the UE 110 based on the TCI state indicated in the MAC CE received in 705, the UE 110 may be configured to apply this control information to PUSCH transmissions that are performed after a predetermined duration 715 has expired.

In 720, the UE 110 receives a signal over the PDCCH. This signal may trigger an uplink transmission over the PUSCH and include a TCI indication. The uplink transmission over the PUSCH is scheduled to occur at 725. At this time, the UE 110 has two options for transmitter beam selection. The first option is for the UE 110 to select a transmitter beam for the scheduled PUSCH transmission in 725 based on the TCI state for a CORESET with the lowest ID in the same BWP in the slot with the scheduling PDCCH. The second option is for the UE 110 to select a transmitter beam for the scheduled PUSCH transmission in 725 based on the TCI state for a CORESEST with the lowest ID in the same BWP in the slot with the scheduled PUSCH.

In some embodiments, the UE 110 may be preconfigured to use the first option or the second option in this type of scenario. The UE 110 may indicate to the cell whether the UE 110 is preconfigured to use the TCI indicated in the MAC CE or the TCI indicated in the PDCCH in a UE capability information message. In other embodiments, the network may configure the UE 110 to use the first option or the second option in this type of scenario. The network may configure the UE 110 with the first option or the second option using a MAC CE or an RRC message.

In some embodiments, CORSESET TCI update may also indicate the TCI is updated by a random access procedure. In this configuration, the TCI can update after N symbols after the response to the physical random access channel (PRACH). This is in contrast to the predetermine duration mentioned above.

Figure 8:
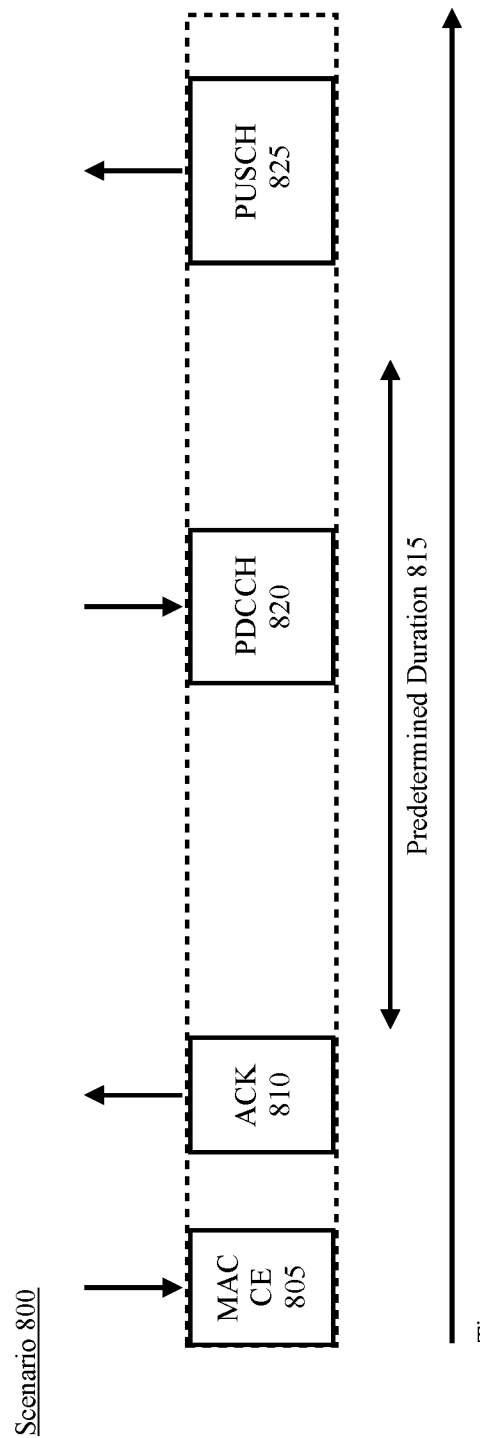
FIG. 8 shows an exemplary scenario in which the UE selects a transmitter beam for a PUSCH transmission scheduled by downlink control information (DCI) format 0_0 if no PUCCH resource is configured in the same BWP and no CORESET is configured according to various exemplary embodiments.

FIG. 8 shows an exemplary scenario 800 in which the UE 110 selects a transmitter beam for a PUSCH transmission scheduled by downlink control information (DCI) format 0_0 if no PUCCH resource is configured in the same BWP and no CORESET is configured according to various exemplary embodiments.

The exemplary scenario 800 relates to the UE 110 performing a PUSCH transmission. The exemplary scenario 800 illustrates a timeline from the perspective of the UE 110.

In 805, the UE 110 receives a MAC CE. In this example, the MAC CE may indicate a particular TCI for a physical downlink shared channel (PDSCH). The MAC CE based TCI activation for the PDSCH may indicate the MAC CE to activate one or more TCI states for PDSCH in active BWP or to activate TCI state for PDSCH in all serving cells.

In 810, the UE 110 transmits an ACK to indicate to the cell that the UE 110 has successfully received the MAC CE in 805. In accordance with various standards and/or to ensure that the cell is configured to receive a transmitter beam selected by the UE 110 based on the TCI state indicated in the MAC CE received in 805, the UE 110 may be configured to apply this control information to PUSCH transmissions that are performed after a predetermined duration 815 has expired.

In 820, the UE 110 receives a signal over the PDCCH. This signal may trigger an uplink transmission over the PUSCH and include a TCI indication for the PDSCH. The uplink transmission over the PUSCH is scheduled to occur at 825. At this time, the UE 110 has two options for transmitter beam selection. The first option is for the UE 110 to select a transmitter beam for the scheduled PUSCH transmission in 825 based on the TCI state for the PDSCH with the lowest ID in the same BWP in the slot with the scheduling PDCCH. The second option is for the UE 110 to select a transmitter beam for the scheduled PUSCH transmission in 825 based on the TCI state for the PDSCH with the lowest ID in the same BWP in the slot with the scheduled PUSCH.

In some embodiments, the UE 110 may be preconfigured to use the first option or the second option in this type of scenario. The UE 110 may indicate to the cell whether the UE 110 is preconfigured to use the TCI indicated in the MAC CE or the TCI indicated in the PDCCH in a UE capability information message. In other embodiments, the network may configure the UE 110 to use the first option or the second option in this type of scenario. The network may configure the UE 110 with the first option or the second option using a MAC CE or an RRC message.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
   at a user equipment (UE):
   receiving a medium access control (MAC) control element (CE), wherein the MAC CE includes first control information associated with transmitter beam selection;
   transmitting an acknowledgement (ACK) to a network in response to receiving the MAC CE;
   receiving a downlink signal over a physical downlink control channel (PDCCH) that schedules an uplink transmission, wherein the downlink signal is received prior to an expiration of a predetermined duration relative to transmitting the ACK and wherein the downlink signal includes second control information associated with transmitter beam selection; and
   transmitting an uplink signal based on the scheduled uplink transmission, wherein the UE selects a transmitter beam for the uplink signal based on one of the first control information or the second control information.

2. The method of claim 1, further comprising:
   transmitting UE capability information to the network, wherein the UE capability information indicates to the network which one of the first control information or the second control information the UE is configured to use as a basis for selecting the transmitter beam.

3. The method of claim 1, further comprising:
   receiving a signal from the network, wherein the signal indicates to the UE which one of the first control information or the second control information the UE is to use as a basis for selecting the transmitter beam.

4. The method of claim 1, wherein the first control information is a first spatial relation indication, the second control information is a second spatial relation indication and the uplink transmission is scheduled for a physical uplink control channel (PUCCH).

5. The method of claim 1, wherein the first control information is a first transmission configuration indicator (TCI), the second control information is a second TCI and the uplink transmission is scheduled for a physical uplink control channel (PUCCH).

6. The method of claim 1, wherein the first control information is a first spatial relation indication, the second control information is a second spatial relation indication and the uplink transmission is scheduled for a physical uplink shared channel (PUSCH).

7. The method of claim 6, wherein the uplink transmission is scheduled by a downlink control information (DCI) format 0_0 and at least one physical uplink control channel (PUCCH) resource is scheduled in the same bandwidth part (BWP) as the PUSCH.

8. The method of claim 6, wherein the uplink transmission is scheduled by a downlink control information (DCI)

format 0_0, no physical uplink control channel (PUCCH) resource is configured in the same bandwidth part (BWP) as the PUSCH and at least one control resource set (CORESET) is configured.

9. The method of claim 6, wherein the uplink transmission is scheduled by a downlink control information (DCI) format 0_0 no physical uplink control channel (PUCCH) resource is configured in the same bandwidth part (BWP) as the PUSCH and no control resource set (CORESET) is configured.

10. A user equipment (UE), comprising:
a transceiver configured to communicate with a network; and
a processor configured to perform operations, the operations comprising:
receiving a medium access control (MAC) control element (CE), wherein the MAC CE includes first control information associated with transmitter beam selection;
transmitting an acknowledgement (ACK) to the network in response to receiving the MAC CE;
receiving a downlink signal over a physical downlink control channel (PDCCH) that schedules an uplink transmission, wherein the downlink signal is received prior to an expiration of a predetermined duration relative to transmitting the ACK and wherein the downlink signal includes second control information associated with transmitter beam selection; and
transmitting an uplink signal based on the scheduled uplink transmission, wherein the UE selects a transmitter beam for the uplink signal based on one of the first control information or the second control information.

11. The UE of claim 10, wherein the first control information is a first spatial relation indication, the second control information is a second spatial relation indication and the uplink transmission is scheduled for a physical uplink control channel (PUCCH).

12. The UE of claim 10, wherein the first control information is a first transmission configuration indicator (TCI), the second control information is a second TCI and the uplink transmission is scheduled for a physical uplink control channel (PUCCH).

13. The UE of claim 10, wherein the first control information is a first spatial relation indication, the second control information is a second spatial relation indication and the uplink transmission is scheduled for a physical uplink shared channel (PUSCH).

14. The UE of claim 13, wherein the uplink transmission is scheduled by a downlink control information (DCI) format 0_0 and at least one physical uplink control channel (PUCCH) resource is scheduled in the same bandwidth part (BWP) as the PUSCH.

15. The UE of claim 13, wherein the uplink transmission is scheduled by a downlink control information (DCI) format 0_0, no physical uplink control channel (PUCCH) resource is configured in the same bandwidth part (BWP) as the PUSCH and at least one control resource set (CORESET) is configured.

16. The UE of claim 13, wherein the uplink transmission is scheduled by a downlink control information (DCI) format 0_0 no physical uplink control channel (PUCCH) resource is configured in the same bandwidth part (BWP) as the PUSCH and no control resource set (CORESET) is configured.

17. An integrated circuit, comprising:
circuitry configured to receive a medium access control (MAC) control element (CE), wherein the MAC CE includes first control information associated with a user equipment (UE) performing transmitter beam selection;
circuitry configured to transmit an acknowledgement (ACK) to a network in response to receiving the MAC CE;
circuitry configured to receive a downlink signal over a physical downlink control channel (PDCCH) that schedules an uplink transmission, wherein the downlink signal is received prior to an expiration of a predetermined duration relative to transmitting the ACK and wherein the downlink signal includes second control information associated with transmitter beam selection; and
circuitry configured to transmit an uplink signal based on the scheduled uplink transmission, wherein the UE selects a transmitter beam for the uplink signal based on one of the first control information or the second control information.

18. The integrated circuit of claim 17, further comprising:
circuitry configured to transmit UE capability information to the network, wherein the UE capability information indicates to the network which one of the first control information or the second control information the UE is configured to use as a basis for selecting the transmitter beam.

19. The integrated circuit of claim 17, further comprising:
circuitry configured to receive a signal from the network, wherein the signal indicates to the UE which one of the first control information or the second control information the UE is to use as a basis for selecting the transmitter beam.

20. The integrated circuit of claim 17, wherein the first control information is a first spatial relation indication, the second control information is a second spatial relation indication and the uplink transmission is scheduled for one of a physical uplink control channel (PUCCH) or a physical uplink shared channel (PUSCH).

* * * * *